(12) United States Patent
Carver et al.

(10) Patent No.: US 10,614,925 B2
(45) Date of Patent: Apr. 7, 2020

(54) MODULAR PORTABLE CASK TRANSFER FACILITY

(71) Applicant: NAC International Inc., Norcross, GA (US)

(72) Inventors: George C. Carver, Norcross, GA (US); Vadim Z. Shtylman, Alpharetta, GA (US); Jay G. Wellwood, Berkeley Lake, GA (US); Michael Yaksh, Lilburn, GA (US); Suresh Babu, Johns Creek, GA (US); Sing Gee Lin, Lilburn, GA (US)

(73) Assignee: NAC INTERNATIONAL INC., Norcross, GA (US)

( * ) Notice: Subject to any disclaimer, the term of this patent is extended or adjusted under 35 U.S.C. 154(b) by 266 days.

(21) Appl. No.: 15/690,765

(22) Filed: Aug. 30, 2017

(65) Prior Publication Data

US 2018/0166178 A1 Jun. 14, 2018

Related U.S. Application Data

(60) Provisional application No. 62/433,471, filed on Dec. 13, 2016.

(51) Int. Cl.
*G21F 5/14* (2006.01)
*B66C 19/00* (2006.01)
*G21C 19/32* (2006.01)

(52) U.S. Cl.
CPC .............. *G21F 5/14* (2013.01); *B66C 19/005* (2013.01); *G21C 19/32* (2013.01)

(58) Field of Classification Search
CPC ......... B66C 1/66; B66C 19/02; B66C 19/005; B66C 17/00; G21F 5/14; G21F 7/005;
(Continued)

(56) References Cited

U.S. PATENT DOCUMENTS 3,081,883 A * 3/1963 Minty ..................... B66C 19/00
180/6.48
4,199,857 A * 4/1980 Meuschke ............. B23P 19/024
29/426.3
(Continued)

FOREIGN PATENT DOCUMENTS

CN 201534754 U 7/2010
CN 202193552 U 4/2012
(Continued)

OTHER PUBLICATIONS

Taiwanese Office Action issued in Taiwan Intellectual Patent Office for Application No. 106143707 dated May 30, 2018 w/ English Translation.
(Continued)

*Primary Examiner* — Glenn F Myers
(74) *Attorney, Agent, or Firm* — Thomas | Horstemeyer, LLP

(57) ABSTRACT

A modular portable cask transfer (MPCT) facility is capable of transferring a canister containing spent nuclear fuel materials from or to a transportation cask respectively to or from a storage overpack. A transfer cask is utilized for the transfer. Telescoping legs enable movement of the transfer cask independent of the canister, which is moved using a hoist. Due to its modular configuration, the MPCT facility can be assembled, disassembled, and moved from one nuclear power plant to another.

18 Claims, 4 Drawing Sheets

(58) Field of Classification Search
CPC ..... G21F 7/06; G21F 9/36; B21F 9/36; G21C 19/10; G21C 19/32
See application file for complete search history.

(56) References Cited

U.S. PATENT DOCUMENTS

| | | | |
|---|---|---|---|
| 5,207,468 A * | 5/1993 | Saulnier | B66C 1/66 294/67.31 |
| 6,793,450 B2 | 9/2004 | Singh et al. | |
| 9,478,322 B1 | 10/2016 | Schilling et al. | |
| 2003/0231733 A1* | 12/2003 | Weber | G21F 5/14 376/272 |
| 2008/0085177 A1* | 4/2008 | Waisanen | B66C 1/422 414/618 |
| 2009/0123255 A1 | 5/2009 | Waisanen | |
| 2014/0186144 A1 | 7/2014 | Singh | |
| 2015/0092904 A1* | 4/2015 | Carver | G21F 5/008 376/272 |
| 2015/0125244 A1 | 5/2015 | Coogan et al. | |

FOREIGN PATENT DOCUMENTS

| | | |
|---|---|---|
| CN | 104743453 A | 7/2015 |
| CN | 104919535 A | 9/2015 |
| CN | 105752850 A | 7/2016 |
| JP | 50-95953 A | 7/1975 |
| JP | 8-113074 A | 5/1996 |
| JP | 2008-101994 A | 5/2008 |
| JP | 2010-228827 A | 10/2010 |
| JP | 2016-533512 A | 10/2016 |
| WO | 02/35552 A1 | 5/2002 |

OTHER PUBLICATIONS

Chinese Office Action for Chinese Patent Application No. 2017113306729 dated Jan. 30, 2019 (w/ English Translation), 16 pages.
Chinese Search Report for Chinese Patent Application No. 2017113306729 dated Jan. 30, 2019, 3 pages.
Japanese Office Action in related, co-pending JP Application No. 2017-238830, dated Jun. 14, 2019. (4 Pages).
Japanese Office Action for Japanese Patent Application No. 2017-238830 dated Nov. 2, 2018 (w/ English Explanation).
Japanese Office Action and Supplemental Search Report in related, co-pending JP Application No. 2017-113306729, dated Oct. 12, 2019. (With English Translation of Office Action).

* cited by examiner

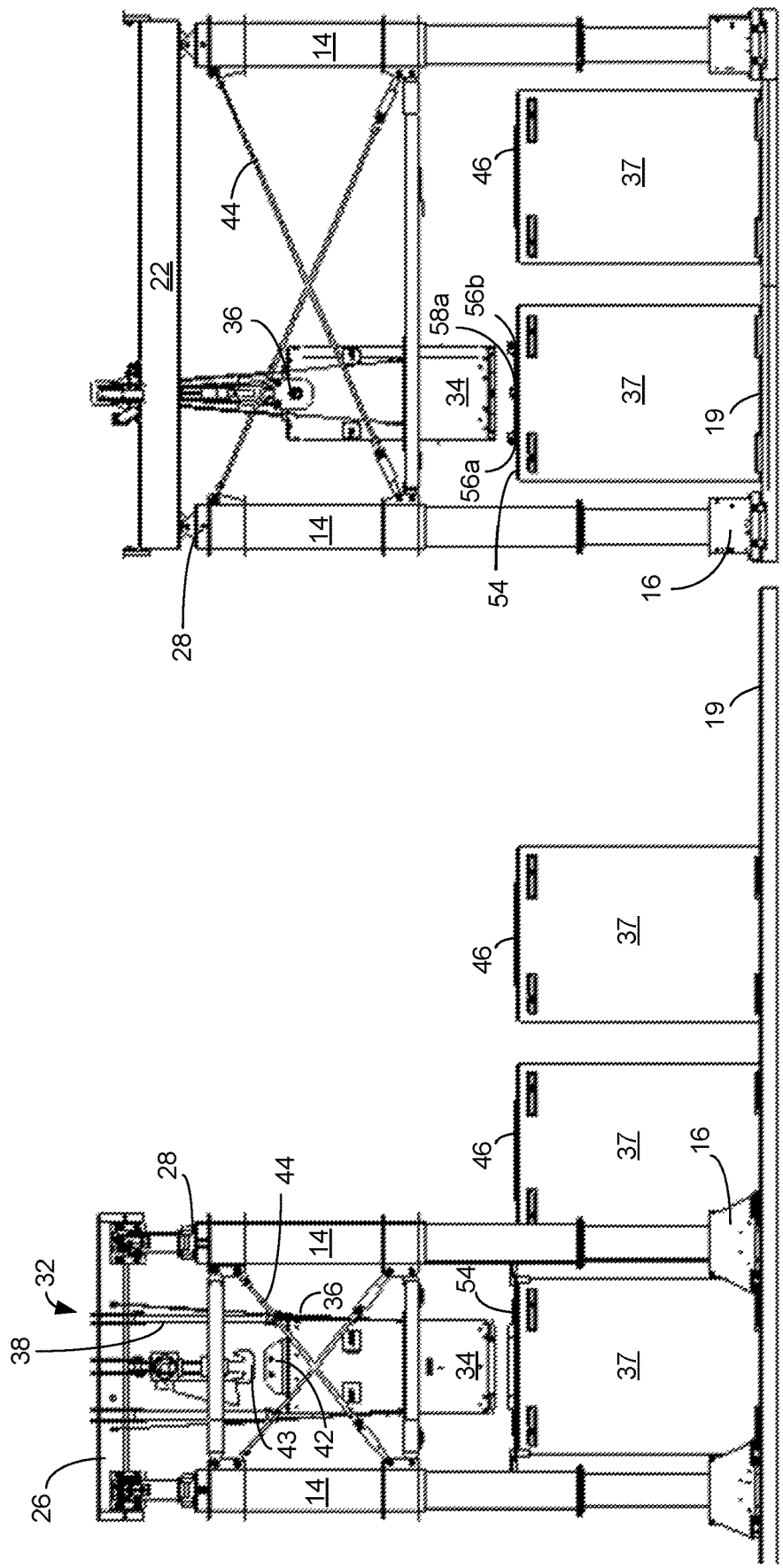

MODULAR PORTABLE CASK TRANSFER FACILITY

CLAIM OF PRIORITY

This application claims priority to and the benefit of provisional application No. 62/433,471, filed Dec. 13, 2016, which is entirely incorporated herein by reference.

FIELD OF INVENTION

The present invention generally relates to apparatus and methods for handling and storing spent nuclear fuel at nuclear power plants.

BACKGROUND

At nuclear power plants having nuclear reactors, spent nuclear fuel is stored in deep reservoirs of water, called "spent fuel pools." When a spent fuel pool reaches its spent fuel capacity limit, or when the nuclear power plant undergoes a complete removal of spent fuel from the spent fuel pool at the end of the life of the facility, the fuel is transferred into metal canisters having final closure lids that are welded closed or sealed with mechanical means at the power plants following spent fuel loading. The sealed canister is then placed into a concrete storage overpack which serves as an enclosure that provides mechanical protection, heat removal features, and radiation shielding for the inner metal canister that encloses the radioactive material. The concrete overpack, which contains the canister within which the radioactive materials are stored, is then placed in the designated secure location outside of the nuclear power plant structure, yet on owner controlled property so as to ensure proper controls and monitoring of the concrete storage overpack containing the metal canister are performed.

The process of removing the spent fuel from the spent fuel storage pool, placing the spent fuel into a metal canister, and placing the metal canister into the concrete storage overpack involves the use of overhead cranes and associated lifting and rigging systems, which are thoroughly evaluated and tested prior to use to ensure that positive, safe control of the components being handled is assured during all normal and credible scenarios, including the possibility of a seismic event. The evaluations, processes, and controls employed to ensure that these components are safely handled at the nuclear power facility are subject to regulatory review and approval. Furthermore, it is important to note that the concrete storage overpack within which the metal canister is stored meets only the regulatory requirements for storage and not off-site transportation of the canisters. Regulations associated with off-site transportation require the use of a specially designed off-site transportation cask, which is quite different in design and materials from the concrete storage overpack and licensed for use by the regulatory authorities under different rules and regulations than those used to authorize concrete storage overpacks.

Upon reaching the end of life for the nuclear power plant, many owners choose to completely remove the spent fuel from the spent fuel storage pool and place it into dry storage concrete overpacks, as outlined above, in an effort to minimize expenses associated with facility operation. Once the spent fuel has been relocated, the existing facility may then be demolished and removed from the owner's property. When this is accomplished, only the concrete or concrete/metal storage overpacks containing the metal canisters within which the spent nuclear fuel and radioactive materials remain. When the need to remove the metal canisters from the site arises, the metal canisters are transferred from the concrete storage overpacks to off-site transportation casks. However, since the structures containing the overhead cranes have been demolished and removed from the site, there is no installed means with which to facilitate transfer of the metal canisters from the concrete storage overpacks to the off-site transportation casks.

SUMMARY OF INVENTION

The present disclosure provides various embodiments of a modular portable cask transfer (MPCT) facility. The MPCT facility is capable of transferring a canister containing spent nuclear fuel materials from or to a transportation cask respectively to or from a storage overpack. Telescoping legs enable movement of the transfer cask independent of the canister, which is moved using a hoist. Due to its modular configuration, the MPCT facility can be assembled, disassembled, and moved from one nuclear power plant to another.

One embodiment, among others, is an MPCT facility having a plurality of parallel elongated telescoping leg assemblies. Each leg assembly has an elongated telescoping leg mounted on a movable dolly. Each telescoping leg has a longitudinal body extending from a top end to a bottom end that is mounted to the movable telescoping leg dolly. The tops ends are movable upwardly and downwardly in relation to the bottom ends.

The MPCT facility includes a plurality of parallel elongated lift beams. Each of the lift beams has a longitudinal body extending from a first end to a second end. Each of the lift beams supported at the top ends of the telescoping legs and oriented in a direction that is perpendicular to the telescoping legs.

The MPCT facility includes a trolley beam assembly comprising a movable elongated trolley beam mounted on a movable trolley beam dolly. The trolley beam has a longitudinal body extending between a first end and a second end. The trolley beam supported by the longitudinal bodies of the lift beams and oriented in a direction that is perpendicular to the lift beams.

The MPCT facility includes a means for connecting a transfer cask to the trolley beam so that the transfer cask can be moved vertically as the top ends of the telescoping legs are moved vertically.

Finally, the MPCT facility includes a hoist associated with the trolley beam. The hoist is for connecting to the canister and moving the canister vertically. The hoist can move the canister from and into the storage overpack, respectively, into and out of the transfer cask. Based upon the separate telescoping legs and the hoist, the transfer cask and the canister can be moved vertically independently of each other.

Another embodiment, among others, of the MPCT facility has a gantry means for attaching to a transfer cask and for moving the transfer cask in a vertical and horizontal direction. Further, the MPCT facility has a hoist means associated with the gantry means, which is moved as the transfer cask is moved in the vertical and horizontal direction. The hoist means can connect to the canister and move the canister vertically independently of the movement of the transfer cask. The hoist means can move the canister from and into the storage overpack, respectively, into and from the transfer cask. It can also move the canister from and into the transportation cask, respectively, into and from the transfer cask.

Other embodiments, methods, apparatus, features, and advantages of the present invention will be or become apparent to one with skill in the art upon examination of the following drawings and detailed description. It is intended that all such additional embodiments, methods, apparatus, features, and advantages be included within this description, be within the scope of the present disclosure, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a front side view of the MPCT facility of FIG. 1.

FIG. 3 is a right side view of the MPCT facility of FIG. 1.

DETAILED DESCRIPTION

Figure 1:
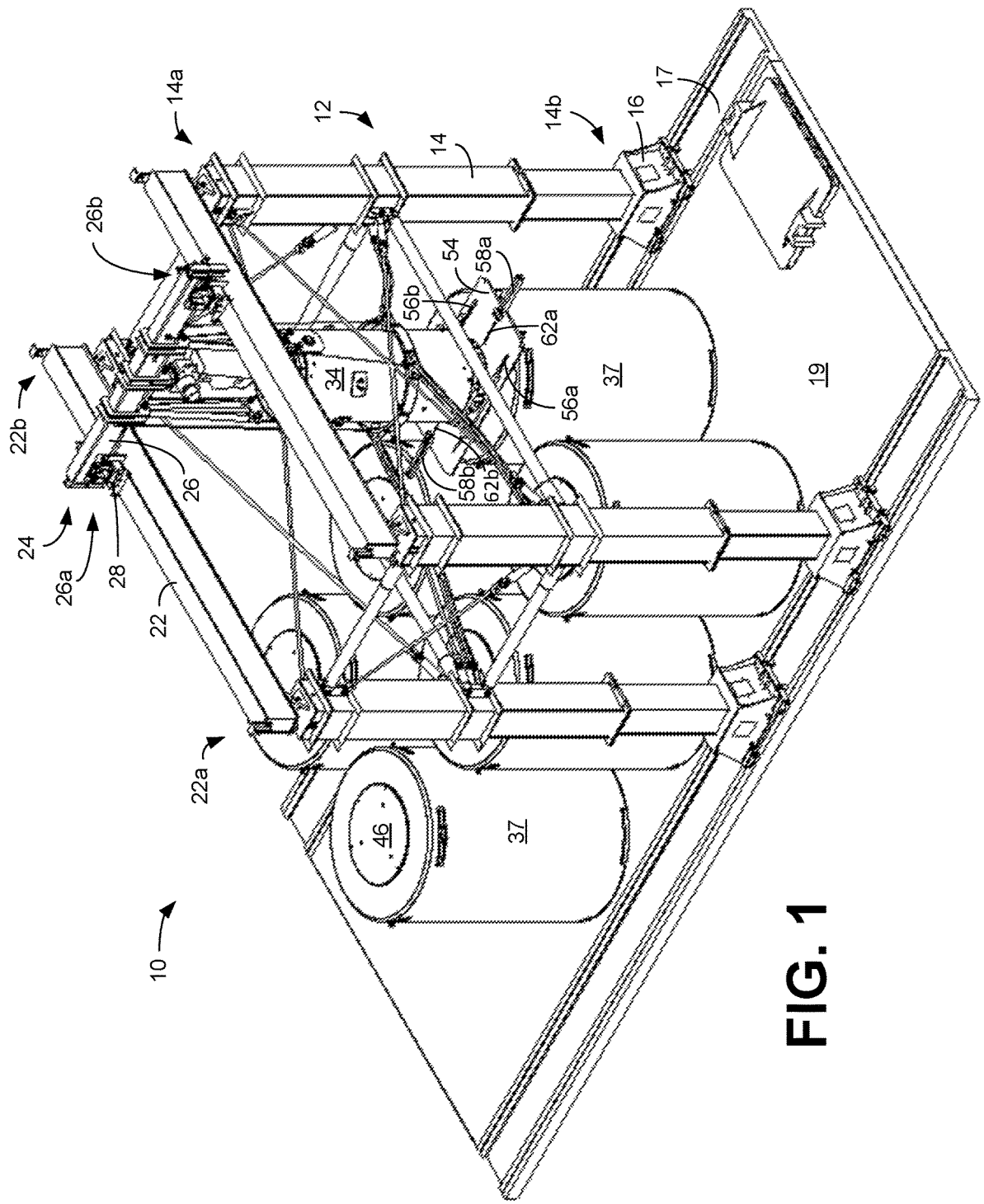
FIG. 1 is a perspective view of a modular portable cask transfer (MPCT) facility in accordance with the present disclosure, showing a transfer cask about to be engaged with a storage overpack at its underside for the purpose of delivering or receiving a canister to or from the storage overpack.

The present disclosure provides various embodiments of a modular portable cask transfer (MPCT) facility 10. An example of an MPCT facility 10 is shown in FIGS. 1 through 5. The MPCT facility 10 can be used to transfer a canister containing spent nuclear fuel materials, such as fuel rods, from or to a transportation cask respectively to or from a storage overpack using a transfer cask as well as independent securing and control of the canister and transfer cask during the transfer operation, which is important if a seismic event occurs during the transfer operation. Due to its modular configuration, the MPCT facility 10 can be easily disassembled, moved, and reassembled so that it can be used at a plurality of nuclear power plants.

Structure and Assembly

Unlike a conventional gantry crane, the MPCT facility 10 has a plurality of parallel elongated telescoping leg assemblies 12 that enable it to move the transfer cask. In this embodiment, there are at least four telescoping leg assemblies. More telescoping leg assemblies may be incorporated, depending upon the needs of the facility. Each leg assembly 12 has an elongated telescoping leg 14 mounted on a movable dolly 16, preferably, a motorized, self-propelled, movable, side-shift dolly with at least four wheels and controlled by a suitable controller. The dollies 16 ride on or within tracks 17 along the top of the existing storage pad 19. Each telescoping leg 14 has a longitudinal body extending from a top end 14a to a bottom end 14b that is mounted to the movable telescoping leg dolly 16. Each longitudinal body of each telescoping leg 14 has an elongated movable outer upper part around and guided by a stationary lower inner part so that the tops ends 14a are movable upwardly and downwardly in relation to the bottom ends 14b. In this example, the upper and lower parts have square cross sections. However, the assembly cross sections can be circular, as well. Furthermore, in the preferred embodiment, a hydraulic system is designed to move the top ends 14a of the telescoping legs 14 upwardly and downwardly in relation to the bottom ends 14b. In other embodiments, a pneumatic system could be employed instead of the hydraulic system.

A plurality of parallel elongated lift beams 22, two in this example, are situated at the top ends 14a of the telescoping legs 14. Each of the lift beams 22 has a longitudinal body extending from a first end 22a to a second end 22b. Each of the lift beams 22 is supported at the top ends 14a of the telescoping legs 14 and is oriented in a direction that is perpendicular to the telescoping legs 14.

A trolley beam assembly 24 comprising a movable elongated trolley beam 26 is mounted on movable trolley beam dollies 28, preferably, a motorized, self-propelled, movable, side-shift dolly with at least four wheels and controlled by a suitable controller. The trolley beam 26 has a longitudinal body extending between a first end 26a and a second end 26b. The trolley beam 26 is supported by the longitudinal bodies of the lift beams 22 and oriented in a direction that is perpendicular to the lift beams 22.

Figure 4:
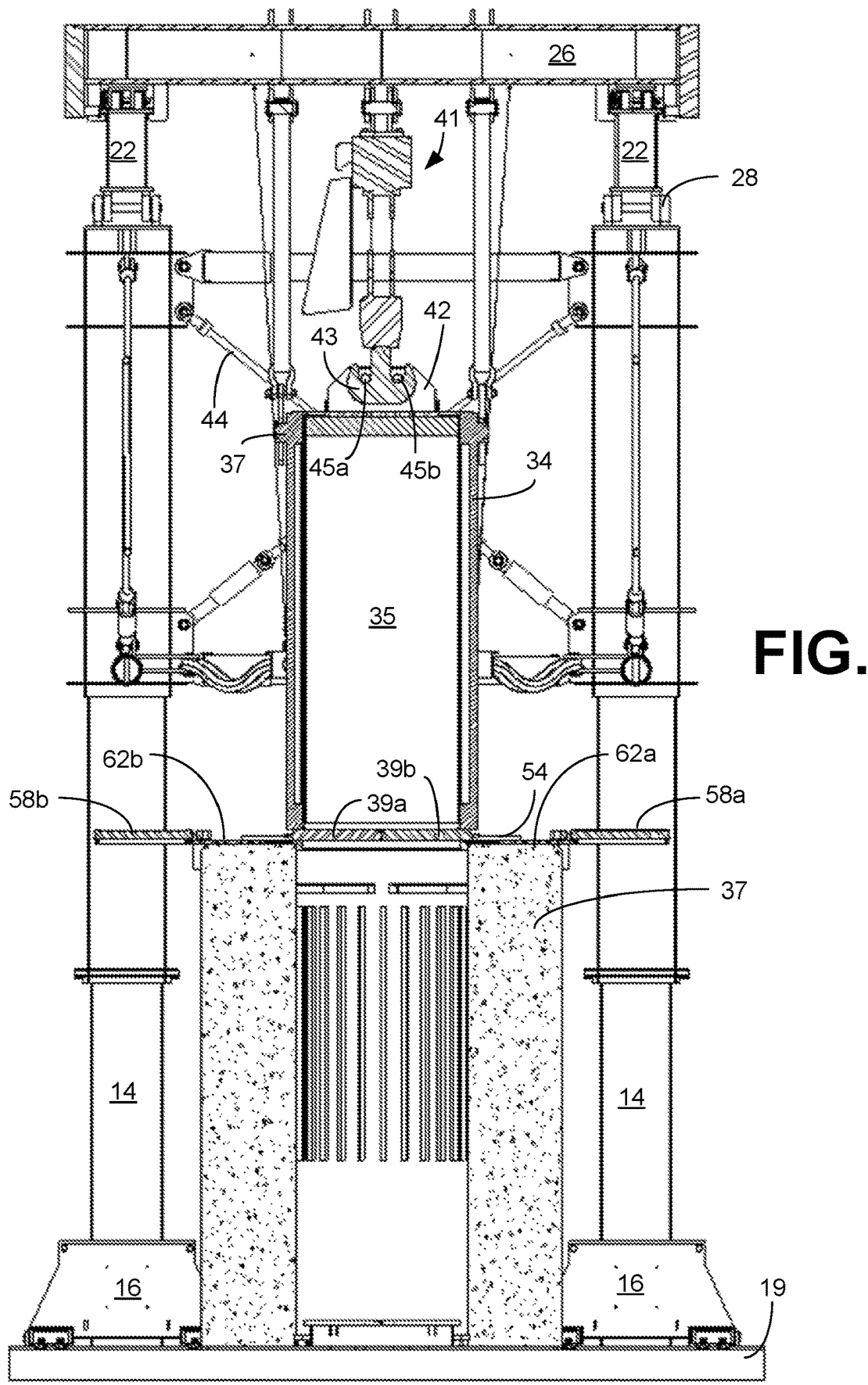
FIG. 4 is a front side view of the MPCT facility of FIG. 1, with partial cross section showing the transfer cask engaged with the storage overpack and showing a canister within the transfer cask and positioned over a storage overpack.
Figure 5:
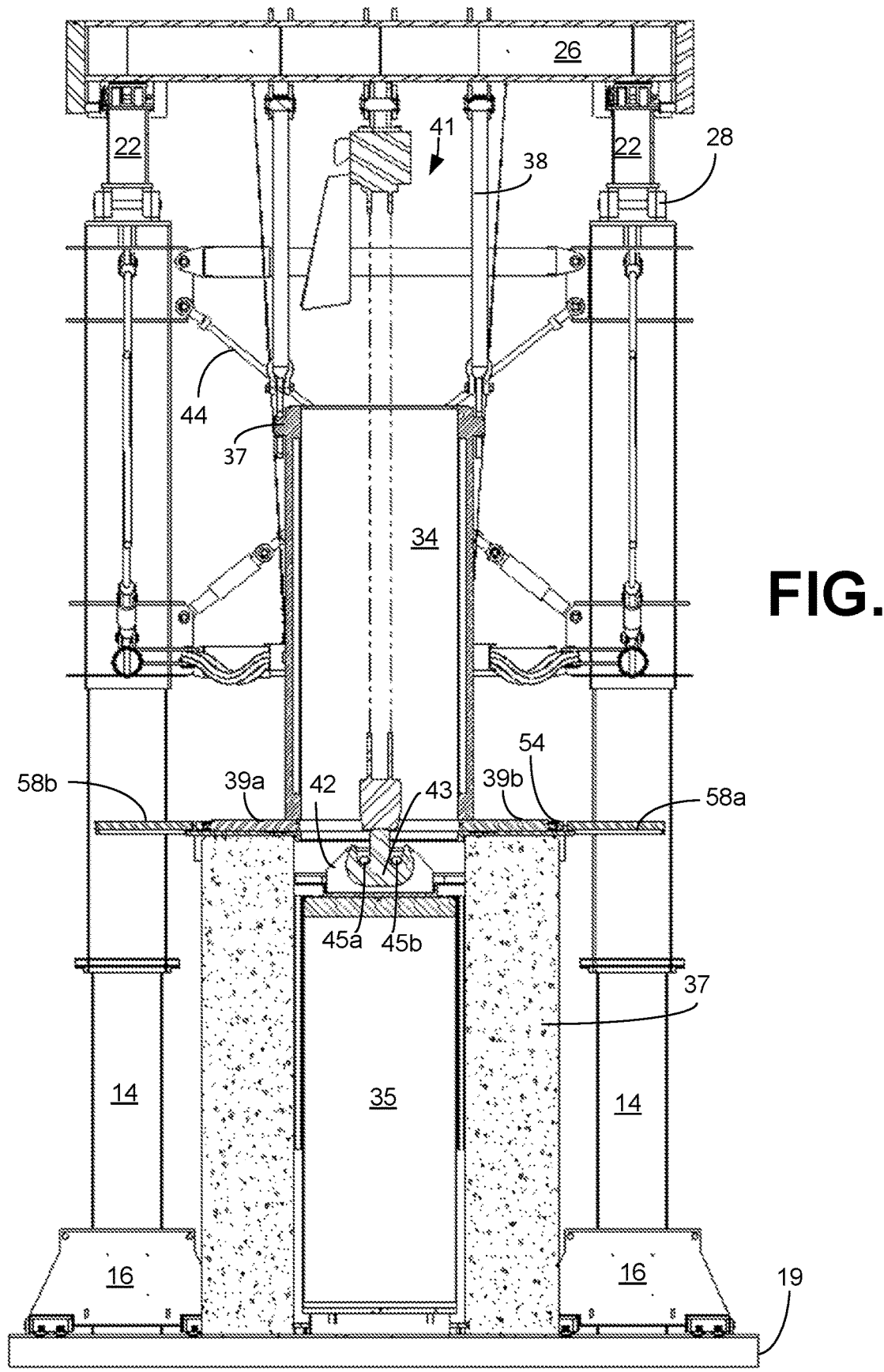
FIG. 5 is a front side view of the MPCT facility of FIG. 1, with partial cross section showing the transfer cask engaged with the storage overpack and showing the canister within the storage overpack and positioned under the transfer cask.

A plurality of lift links 32 can be used to attach the trolley beam 26 to a transfer cask 34, which can be used to remove or insert a cylindrical canister 35 made, for example, from metal, from or into a cylindrical storage overpack 37 made, for example, from concrete or concrete and metal, stored upon the storage pad 19. An example of a storage overpack 37 is described in co-pending application Ser. No. 14/160,833, filed Jan. 22, 2014, which is incorporated herein by reference in its entirety. The transfer cask 34 is made from, for example, metal and other suitable materials to provide protection from hazardous radiation, and has a plurality of lift plates 36 mounted to the transfer cask 34 to enable the transfer cask 34 to be lifted and lowered as the telescoping legs 14 are lifted and lowered. This embodiment has two lift plates 36 situated at opposing sides of the transfer cask. As shown in FIGS. 4 and 5, the transfer cask 34 has a ring 37 defining an open hole, or aperture, at its top end and two sliding metal doors 39a and 39b at its bottom end. This embodiment of the transfer cask 34 is described in further detail in co-pending application Ser. No. 14/160,833, filed Jan. 22, 2014, which is incorporated herein by reference.

The sliding doors 39a and 39b, which are hydraulically or pneumatically actuated, slide outwardly sideways from the transfer cask 34. Two c-shaped channels are welded on two opposing sides at the underside of the transfer cask 34 to capture respective side edges of the doors 39a and 39b, hold them in place, and provide a sliding surface.

A plurality of elongated connectors 38 connect the lift links 32 to the lift plates 36 of the transfer cask 34. The elongated connectors 38 can be, for example, slings (as shown), fixed rods, fixed links, or other apparatus, and can be made of a variety of materials, but are preferably metal.

The MPCT facility 10 further includes a conventional hoist 41, preferably a chain hoist, with a hook 43 designed to connect to a canister lift adaptor 42 that is mounted to the canister 35 and designed to move the canister 35 upwardly and downwardly independent of the transfer cask 34, which is moved upwardly and downwardly via the telescoping legs 14. The hook 43 engages with the canister lift adaptor 42 and is restrained using two engagement pins 45a and 45b that essentially pin the hook 43 to the adaptor 42. The hole in the top of the transfer cask 34 is of sufficient size to enable the hook 43 associated hoist 41 to pass through the transfer cask 34.

Instead of a single hoist, a dual hoist can also be used. Further, in the preferred embodiment, the chain hoist is air operated. However, in other embodiments, the hoist(s) may be an electrically operated wire rope hoist(s) or any combination of electrical or pneumatic chain or wire rope hoisting system.

A plurality of elongated seismic restraint rods 44 can be employed to assist with securing the MPCT facility 10 by making the structure more rigid and therefore resistant to seismic induced lateral movements that could serve to upset the listing arrangement. In this example, there are two on each side in a crossing configuration where each restraint rod 44 connects either a top end or a bottom end of one movable outer upper part of one telescoping leg 14 to a bottom end or a top end, respectively, of another adjacent movable outer upper part of an adjacent leg 14.

For further seismic stability in connection with the transfer cask 34, the MPCT facility 10 may optionally be provided with, as illustrated in FIG. 1, a ring 48 surrounding the transfer cask 34 that is supported and held in place by cables 52 that attach between the ring 48 and each of the legs 14. In essence, the ring 48 with cables 52 prevents the transfer cask 34 from swinging in the horizontal direction.

Referring to FIG. 1, a transfer adaptor 54 is temporarily situated between the transfer cask 34 and the storage overpack 37 when they are engaged to assist in supporting the transfer cask 34 and to open and close the doors 39a and 39b at the underside of the transfer cask 34. The transfer adaptor 54 includes generally flat rectangular metal plate having a centralized hole through which the canister 35 is passed. The transfer adaptor 54 has indexing rails 56a and 56b on the plate along its sides to assist with positioning the transfer cask 34 and to serve as guides for the doors 39a and 39b. The transfer adaptor 54 has hydraulically or pneumatically operated cylinders 58a and 58b with corresponding rods 62a and 62b for operating (i.e., pushing and pulling) respectively the doors 39a and 39b of the transfer cask 34.

Use and Operation

The MPCT facility 10 can be used to transfer a canister 35 containing spent nuclear fuel materials, such as fuel rods, from or to a transportation cask (not shown) respectively to or from a storage overpack 37 using a transfer cask 34 as well as independently securing and controlling the canister 35 and transfer cask 34 during the transfer operation, which is important if a seismic event occurs during the transfer operation.

When the canister 35 is to be moved out of the storage overpack 37 to a transportation cask, a lid 46 at the top of the overpack 37 is removed. The transfer adaptor 54 is placed on the storage overpack 37. The transfer cask 34 is then positioned over the storage overpack 37. The doors 39a and 39b of the transfer cask 34 are opened with the transfer adaptor 54. The hook 42 of the hoist 41 is lowered through the transport cask 34 and is engaged with the canister lift adaptor 42 using the engagement pins 45a and 45b. The canister 35 is lifted vertically out of the storage overpack and into the transfer cask 34. The doors 39a and 39b of the transfer cask 34 are closed with the transfer adaptor 54. The telescoping legs 14 are raised in order to raise the transfer cask 34.

The transfer adaptor 54 (or another like adaptor) is placed over the transportation cask, which is open at its top for receiving the canister 35. The transfer adaptor 54 is placed on the transportation cask. The dollies 16 and 28 are used to move the transfer cask 34 with the canister 35 to a position over and then on the transfer adaptor, which is on top of the transportation cask. The doors 39a and 39b of the transfer cask 34 are opened with the transfer adaptor 54. The hoist 41 lowers the canister 35 into the transportation cask. The engagement pins 45a and 45b are retracted to disengage the hook 43 from the transfer adaptor 54. The hoist 41 raises its hook 43. The doors of the transfer cask 34 are closed with the transfer adaptor 54. The dollies 16 and 28 are used to move the transfer cask 34 away from the transportation cask. The transfer adaptor 54 is removed.

When the canister 35 is to be moved into the storage overpack 37 from a transportation cask, the procedure described in the previous paragraph is simply reversed. Furthermore, the process may be used to transfer a canister from one storage overpack to another storage overpack or inspection station located on the same storage pad 19.

Variations and Modifications

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure.

As an example of a variation, the telescoping legs 14 could have more than two nesting parts, i.e., more than an upper and lower part.

As another example of a variation, the transfer cask 34, the canister 35, and/or the storage cask 37 can have other cross sectional shapes that are not circular, for example, square, rectangular, octagonal, etc., and the facility 10 of the present disclosure could be used in connection with these.

At least the following is claimed:
1. A modular portable cask transfer facility for transferring a canister containing spent nuclear fuel materials from or to a transportation cask respectively to or from a storage overpack by using a transfer cask, the facility comprising:
   a plurality of parallel elongated telescoping leg assemblies, each leg assembly having an elongated telescoping leg mounted on a movable dolly, each telescoping leg having a longitudinal body extending from a top end to a bottom end that is mounted to the movable telescoping leg dolly, the tops ends being movable vertically in relation to the bottom ends, each longitudinal body of each telescoping leg comprising an elongated movable outer part around and guided by a stationary inner part;
   a plurality of elongated seismic restraint rods, each restraint rod connecting either a top end or a bottom end of one movable outer part of one telescoping leg to a bottom end or a top end, respectively, of another adjacent movable outer part of an adjacent leg;

a plurality of parallel elongated lift beams, each of the lift beams having a longitudinal body extending from a first end to a second end, each of the lift beams supported at the top ends of the telescoping legs and oriented in a direction that is perpendicular to the telescoping legs;

a trolley beam assembly comprising a movable elongated trolley beam, the trolley beam having a longitudinal body extending between a first end and a second end, the trolley beam oriented in a direction that is perpendicular to the lift beams, the trolley beam supported by first and second movable dollies, the first and second movable dollies supported by the longitudinal bodies of the lift beams;

a means for connecting the transfer cask to the trolley beam so that the transfer cask can be moved vertically as the top ends of the telescoping legs are moved vertically; and a hoist associated with the trolley beam, the hoist for connecting to the canister, the hoist for moving the canister vertically, the hoist for moving the canister from and into the storage overpack, respectively, into and from the transfer cask;

whereby, based upon the separate telescoping legs and the hoist, the transfer cask and the canister can be moved vertically independently of each other.

2. The facility of claim 1, further comprising a transfer cask having a plurality of lift plates on its sides and wherein the means for connecting comprises a plurality of lift links mounted to the trolley beam and a plurality of elongated connectors connecting the lift links to the lift plates.

3. The facility of claim 2, wherein the elongated connectors are slings.

4. The facility of claim 2, wherein the elongated connectors are fixed links.

5. The facility of claim 2, wherein the transfer cask comprises a canister that contains the spent nuclear fuel materials.

6. The facility of claim 1, wherein the movable telescoping leg dollies and the movable trolley beam dollies are self-propelled dollies.

7. The facility of claim 1, further comprising a hydraulic system designed to move the top ends of the telescoping legs vertically in relation to the bottom ends.

8. The facility of claim 1, wherein the telescoping leg assemblies comprise four and wherein the lift beams comprise two.

9. The facility of claim 1, wherein the hoist is an air operated chain hoist.

10. A method, comprising:

assembling and using the modular portable cask transfer facility of claim 1 at a first nuclear power plant;

after using the assembled facility, disassembling the facility into separate modular parts wherein the separate modular parts include at least the following: each of the telescoping leg assemblies, each of the lift beams, the trolley beam with mounted lift links, each of the slings, and the hoist;

transporting the separate modular parts to a second nuclear power plant that is different than the first nuclear power plant; and reassembling the facility from the separate modular parts at the second nuclear power plant and using the reassembled facility at the second nuclear power plant.

11. A modular portable cask transfer facility for transferring a canister containing spent nuclear fuel materials from or to a transportation cask respectively to or from a storage overpack, the facility comprising a plurality of parallel elongated telescoping leg assemblies, each leg assembly having an elongated telescoping leg mounted on a movable dolly, each telescoping leg having a longitudinal body extending from a top end to a bottom end that is mounted to the movable telescoping leg dolly, the tops ends being movable upwardly and downwardly in relation to the bottom ends, each longitudinal body of each telescoping leg comprising an elongated movable outer part around and guided by a stationary inner part;

a plurality of elongated seismic restraint rods, each restraint rod connecting either a top end or a bottom end of one movable outer part of one telescoping leg to a bottom end or a top end, respectively, of another adjacent movable outer part of an adjacent leg;

a plurality of parallel elongated lift beams, each of the lift beams having a longitudinal body extending from a first end to a second end, each of the lift beams supported at the top ends of the telescoping legs and oriented in a direction that is perpendicular to the telescoping legs;

a trolley beam assembly comprising a movable elongated trolley beam mounted on first and second trolley beam dollies, the trolley beam oriented in a direction that is perpendicular to the lift beams, the trolley beam having a longitudinal body extending between a first end and a second end, the trolley beam supported by the first and second trolley beam dollies residing upon the longitudinal bodies of the lift beams;

a plurality of lift links mounted to the trolley beam;

a transfer cask containing the canister, the transfer cask can be moved vertically as the top ends of the telescoping legs are moved vertically;

a plurality of lift plates mounted to the transfer cask;

a plurality of elongated connectors connecting lift links to the lift plates; and a hoist connected to a canister lift adaptor that is mounted to the canister and designed to move the canister vertically independently of the transfer cask into and out of the storage overpack.

12. The facility of claim 11, wherein the movable telescoping leg dollies and the movable trolley beam dollies are self-propelled dollies.

13. The facility of claim 11, further comprising a hydraulic system designed to move the top ends of the telescoping legs vertically in relation to the bottom ends.

14. The facility of claim 11, wherein the telescoping leg assemblies comprise four and wherein the lift beams comprise two.

15. The facility of claim 11, wherein the hoist is an air operated chain hoist.

16. The facility of claim 11, wherein the elongated connectors are slings.

17. The facility of claim 11, wherein the elongated connectors are fixed links.

18. A method, comprising:

assembling and using the modular portable cask transfer facility of claim 11 at a first nuclear power plant;

after using the assembled facility, disassembling the facility into separate modular parts wherein the separate modular parts include at least the following: each of the telescoping leg assemblies, each of the lift beams, the trolley beam with mounted lift links, each of the slings, and the hoist;

transporting the separate modular parts to a second nuclear power plant that is different than the first nuclear power plant; and reassembling the facility from the separate modular parts at the second nuclear power plant and using the reassembled facility at the second nuclear power plant.

* * * * *